(No Model.)

D. B. MORRELL.
JOINT PACKING BAND.

No. 332,735. Patented Dec. 22, 1885.

WITNESSES:
John W. Coy
Wm. H. Carson

INVENTOR
David B. Morrell
per
George C. Buckley
Atty.

N. PETERS, Photo-Lithographer, Washington, D. C.

UNITED STATES PATENT OFFICE.

DAVID B. MORRELL, OF PHILADELPHIA, PENNSYLVANIA.

JOINT-PACKING BAND.

SPECIFICATION forming part of Letters Patent No. 332,735, dated December 22, 1885.

Application filed November 19, 1885. Serial No. 183,374. (No model.)

*To all whom it may concern:*

Be it known that I, DAVID B. MORRELL, a citizen of the United States, and a resident of Germantown, Philadelphia, Pennsylvania, have invented an Improved Joint-Band for Making Molten-Lead Joints; and I do hereby declare the following to be a full, clear, and exact description of the same, reference being had to the annexed drawings, making part hereof.

The nature of my invention will fully appear from the following specification and claims.

Heretofore in making leaden faucet-joints it has been customary to use a clay band which was bent around the joint and pushed into the edge of the same, leaving what plumbers call the "gate" open to receive the molten lead designed to close the joint tight.

Without reciting the disadvantages of this clay process, I desire it to be understood that my device is intended to take the place of that old device; and it consists of a band formed by wrapping asbestus-cord packing around a pliant rubber tube containing sand or other loose filling. This band is provided at its two ends with two metal clamps firmly secured in place and connected with each other by means of a thumb-screw or set-screw, to draw the clamps toward each other, and thus tighten the band.

Figure 1:
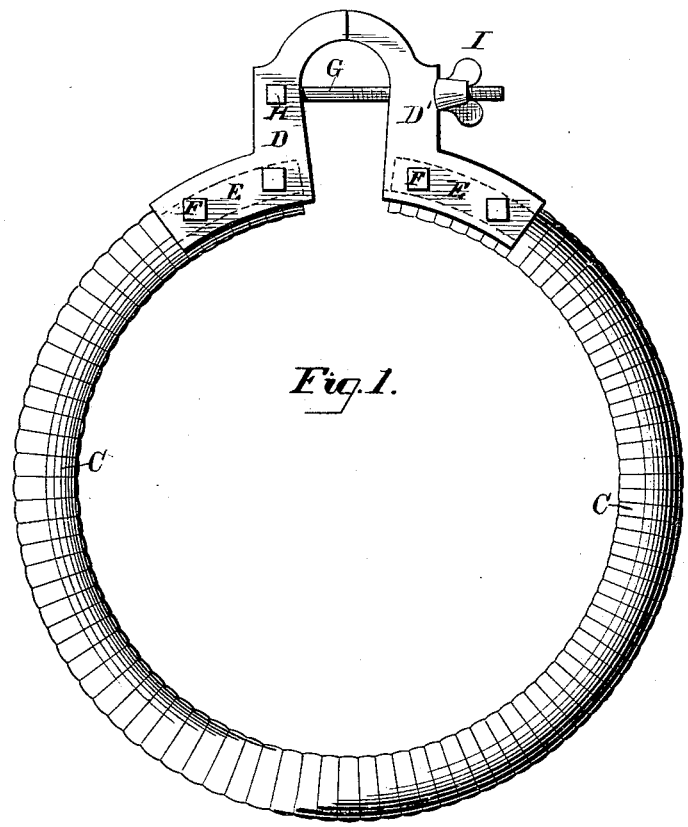
Figure 2:
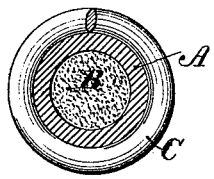
Figure 3:
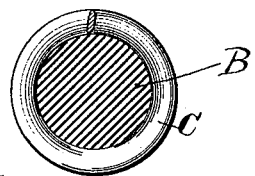
Figure 4:
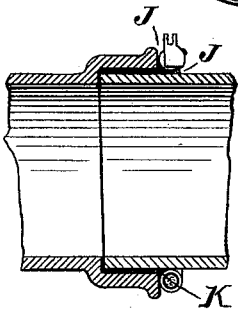

In the drawings, Figure 1 is a side view of my complete packing-band; Fig. 2, a detached cross sectional view of my band, showing the asbestus ring, however, in coil; Fig. 3, a similar view of a modification of my device, the modification having the interior made of a cylindrical solid ply-rubber band, instead of a filled rubber tube; Fig. 4, a broken longitudinal sectional view of two ends of faucet-sections, showing the joint and my band closing the same.

A is the pliant rubber tube; B, a sand or other yielding filling within the same; C, the asbestus-cord packing coiled spirally around the rubber tube; D D', two clamps secured to the ends of the band; E E' (in dotted lines) are two wooden plugs, one in each end of the tube A, to enable the bolts F F to obtain a pinch, grasp, or hold; G, a screw pivoted at H, and passing through a hole or slot in that section of the clamps marked D'. This section or ear of the clamp is drawn up by the thumb-nut I on the screw.

The parts of the clamps which embrace or are secured to the band do not pass completely around the latter, but terminate below and at the side before extending the thickness of the band, leaving space below and at one side, whereby the metal clamp does not come into contact with the faucet, (see J J, Fig. 4.) This feature permits the band to flatten and make a tight joint at its points of contact with the faucet. The band in use does not flatten to such a degree as to prevent its forming a beveled edge upon the lead filled in. (See the point of the broad black line at K, Fig. 4.) The object of employing the asbestus is to prevent the molten metal from burning the inner-contained yielding rubber band.

When a rubber tube such as is shown in Fig. 2 is used, I fill it with sand, to prevent it from kinking in bending. A solid cylindrical ply-rubber band, as shown in Fig. 3, will not kink in bending. The ply-rubber is better than pure rubber, because it will not easily stretch when the tension of the screw G is brought to bear upon it.

The space L in Fig. 1 is the gate through which, when my band is in place, the molten lead is poured into the joint.

My band is applied by removing thumb-nut I, spreading the ends of the band, and bending it around the joint, as the old clay strip was bent, then bringing the ends together on the screw, as shown in Fig. 1, and tightening up the nut I.

Other soft or yielding tubes or fillings may be covered with the coil of asbestus packing; but I prefer a solid cylindrical band of ply-rubber or a ply-rubber tube filled with sand so covered with the fire-proof packing.

What I claim as new is—

1. As a new article of manufacture, a joint-packing band for making lead joints, consisting of a yielding interior or core protected by an exterior of coiled cord asbestus packing, the ends being provided with metal blocks D D', to form a gate through which to pour the lead and to provide substantial means for drawing the two ends of the packing-band together, substantially as described.

2. As a new article of manufacture, a joint-packing band for making lead joints, consisting of a yielding interior or core protected by an exterior of coiled cord asbestus packing, the ends being provided with metal blocks D D', to form a gate through which to pour the lead, and thumb nut and screw G I, to tighten up the band, substantially as described.

3. As a new article of manufacture, a joint-packing band for making lead joints, consisting of a rubber interior core wrapped with cord asbestus packing, for protection against heat, and metal blocks D D', with the thumb nut and screw G I, to draw the blocks together and tighten the packing-band on the joint to be filled, substantially as described.

DAVID B. MORRELL.

Witnesses:
GEORGE E. BUCKLEY,
WM. H. CARSON.